May 4, 1965 F. M. LEOPOLD 3,181,980

METHOD OF MANUFACTURING SEMI-CONDUCTIVE DEVICES

Filed Feb. 20, 1961

INVENTOR
FRANS M. LEOPOLD.
BY
AGENT

United States Patent Office | 3,181,980
Patented May 4, 1965

3,181,980
METHOD OF MANUFACTURING SEMI-CONDUCTIVE DEVICES

Frans Martinus Leopold, Emmasingel, Eindhoven, Netherlands, assignor to North American Philips Company, Inc., New York, N.Y., a corporation of Delaware
Filed Feb. 20, 1961, Ser. No. 90,477
Claims priority, application Netherlands, Mar. 12, 1960, 249,359
10 Claims. (Cl. 148—177)

This invention relates to a method of manufacturing semi-conductive devices, such as transistors and crystal diodes, in which contact material in a liquid state is brought into contact with the semi-conductor body and is melted or alloyed on this body.

In this alloying, a small quantity of the semi-conductive material is dissolved in the contact material from which it segregates on cooling and grows to the semi-conductor body, for which in most of the cases a single crystal is used. The segregated layer usually has absorbed active impurities, such as acceptors and/or donors from the contact material which influence the conductivity and/or the conductivity type of the segregated layer. Between the segregated layer and the original semi-conductor material a junction is formed which, for reasons which are not essential here, should preferably have a regular and flat shape.

Initially, contacts were alloyed on such bodies by providing a quantity of contact metal, usually in the form of a pellet, on a semi-conductor body and heating both together at a temperature above the eutectic of the materials to be connected. After it has appeared that in this case the alloying process grew in a comparatively irregular manner from a touching point of the materials and yielded irregular junctions between the segregated material and the original semi-conductor material, it was suggested to cause the contact material to drop in a molten state on the semi-conductor body, as a result of which the alloying process grew from the immediately formed touching point and smooth junctions were formed. The speed at which the material hits the body, hereinafter called hitting speed, depends on the height of fall; since the alloying process is usually carried out in a so-called alloying jig, the height of fall is limited by the proportions of the alloying jig. So far only a small height of fall has been used because the use of larger jigs is not only expensive but also unattractive because with the increase of this size also the danger of introducing impurities increases.

One of the objects of the present invention is to render larger hitting speeds possible.

According to the invention, the semi-conductor body is rotated in a centrifuge while the contact material is initially at a smaller distance from the axis of rotation than the body and subsequently is detached in a melted stage and thrown on the body. Since in this case forces may act on the contact material which exceed the gravity by far, large hitting speeds may be obtained in this manner also when using jigs of small proportions.

It is noted that it is known to treat semi-conductive devices provided with an envelope in a centrifuge in order to increase the volumetric efficiency of a filling agent provided in this envelope.

According to a first favourable embodiment, the semi-conductor member is centrifuged in an alloying jig containing a space, which is stable in at least one state for receiving this material, which jig is tiltable so that this material may move freely to another position, under the influence of the centrifugal force, into the direction of the semi-conductor body.

According to another favourable embodiment, the semi-conductor body is centrifuged in an alloying jig having a space for receiving the contact material, which space is connected to the space of the body by means of a capillary aperture, in which the width of the aperture, in co-operation with the surface tension of the melted contact material, is chosen so that this material moves through the aperture and is thrown on the body only when receiving a rapid rotation.

Alternatively it is possible to centrifuge the semi-conductor body in an alloying jig having a space in which the contact material is brought at a temperature at which it is in a solid state, which space is connected to the space of the body by means of an aperture, which is so small that the contact material cannot move through it, after which, during centrifuging, the temperature is raised to the melting point of the contact material at which this material moves through the opening and is thrown on the body.

According to a further possibility, the semi-conductor body is centrifuged in an alloying jig in which the contact material is provided in a space which is lower than the space of the body and is connected to this space by an inclined channel so that the contact material moves as soon as the centrifugal force can exceed the action of gravity on the inclined plane.

When in such a method the alloying jig is tilted, it is possible that the jig moves under the influence of the centrifugal force against the action of a spring.

However, it is also possible to tilt the jig by means of a control member to be operated from without.

When providing contacts on semi-conductor bodies, the use of masks for obtaining definite configurations is known. Because in the above methods very high hitting speeds are obtained, these methods are excellently suitable for obtaining accurate configurations.

For example, it is possible to alloy two contacts which are separated by a narrow uncovered strip by stretching a thin wire across the surface of the body and throwing the contact material on this surface and this wire. In the shadow of the wire an uncovered strip remains.

When alloying contacts on semi-conductor bodies, usually jigs are used in which a number of such bodies can be treated at a time. Although in the above jigs were discussed in which only one body could be treated, the invention naturally also comprises the jigs in which several bodies can be treated at a time.

In order that the invention may be readily carried into effect, some embodiments thereof will now be described in greater detail, by way of example, with reference to the accompanying drawing, in which FIGURES 1 and 8 are diagrammatic sectional views of centrifuges with some alloying jigs;

Figures 1, 2, 3, 4, 5, 6, 7, 8, 9, 10:
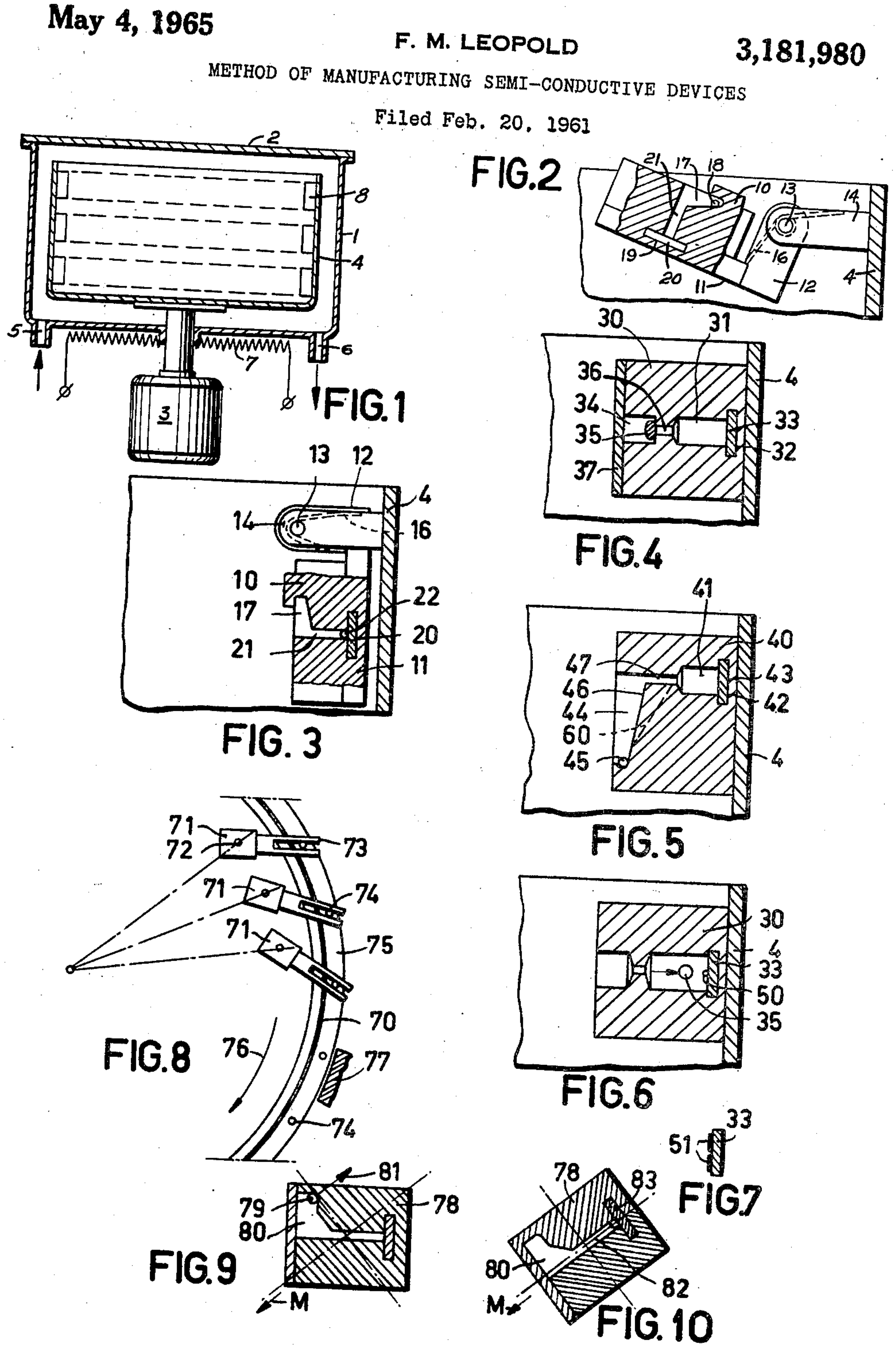
FIGURES 2–5 and FIGURES 9 and 10 are enlarged diagrammatic views of alloying jigs provided in a centrifuge.
FIGURE 6 is a sectional view of a jig destined for alloying two contacts at a small distance from each other.
FIGURE 7 is a sectional view of a semi-conductor body manufactured in the manner as shown in FIGURE 6.

For the sake of simplicity, the alloying jigs are shown as one assembly, in reality they exist, as is common practice, of several parts so as to render the insertion and removal of the semi-conductor bodies possible. The commonly used clamps for keeping these members together are not shown either.

A centrifuge, in which the method described may for example be carried out consists, for example, as shown in FIGURE 1, of a closable vessel 1 having a cover 2 in which a centrifuge drum 4 is provided to be driven by a motor 3. For adjusting a definite atmosphere in the vessel, supply and exhaust pipes 5 and 6 are provided, while the temperature is controllable by means of a heating element 7. Against the inner wall of the drum are provided a number of alloying jigs provided in series 8.

A first embodiment of such a jig is shown, on an enlarged scale, in two states in FIGURES 2 and 3. This jig, indicated by the numeral 10, is supported by a rotary holder 11 which is provided with an arm 12 which is hung to a support 14 in a rotary manner at the shaft 13. This support is on the inner wall of the drum 4. A spring 16 provided around the shaft 13 and shown in dotted lines forces the holder 11 with the jig 10 in the state shown in FIGURE 2 as long as the centrifuge does not rotate.

The jig 10 which may for example be manufactured from graphite or chrome iron and which may consist of various parts not shown separately, has a space 17 for receiving the contact material 18 and a room 19 for the semi-conductor body 20.

A channel 21 which empties above the semi-conductor member 20 connects its space 19 to the space 17 for the contact material. The semi-conductor body may for example consist of germanium or silicon, while the contact material may consist for example of metal, such as indium, aluminum, lead, tin, bismuth, or alloys of these elements, if desired while adding acceptors and/or donors such as gallium, boron, phosphorus, arsenic and antimony.

After the alloying jig 10 has been filled in the position as shown in FIGURE 2, the vessel 1 is closed and filled with a mostly inert or reducing gas, such as hydrogen, and is then heated to a temperature at which the contact material 18 is melted. When using indium as a contact material, this temperature may be for example 520° C.

The centrifuge drum 4 is now rotated by means of the motor 3, as a result of which the jig 10 with the holder 11 gradually move, with increasing speed, to the position shown in FIGURE 3 against the action of the spring 16. Just before this position is reched, the contact material 18 has left its space 17 and is thrown on the semi-conductor body 20 at high speed at a result of which a melted contact 22 is formed.

In a second embodiment of the method acording to the invention, the alloying jig shown in FIGURE 4 may be used. It consists for example of a graphite body 30 in which a space 31 above the space 32 for the semi-conductor body 33 is provided, while in addition a second space 34 for receiving the contact material 35 is present which is connected to the space 31 by means of a narrow bore hole 36. The space 34 is closed by means of a cover plate 37.

When using this alloying pig, the centrifuge may be heated to the required temperature as in the preceding embodiment before it is rotated. The width of the bore hole 36 is chosen so that, in accordance with the surface tension of the material 35, the cohesion of this material with respect to that of the jig and the diameter of the drum, the material 35 moves only at a high rotation speed through the bore hole 36 to hit the surface of the semi-conductor body 33 at high speed.

When using this alloying jig it is also possible to vary the sequence of the treatment in that sense that the drum 4 is already rotated before the contact material 35 is melted. The width of the bore hole 36 may now be chosen so that the material moves through the bore hole as soon as it is melted.

The alloying jig 40 shown in FIGURE 5 again has a space 41 above the space 42 of the semi-conductor body 43. The space 44 for receiving the contact material 45 extends along a steep slope 46 into the direction of an aperture 47 in the space 41. When using this alloying jig, the centrifuge is rotated only after the material 45 is melted. As soon as the rotation speed is so large that the quotient of the centrifugal force, divided by the gravity, is larger than the tangent of the angle enclosed by the slope 46 and the horizontal line, the contact material will move up the slope, finally to be thrown at high speed on the semi-conductor body.

Because in these methods the contact material is thrown on the semi-conductor body at high speed, at which it rapidly spreads, these methods are particularly suitable to cover comparatively large surfaces with little material, as a result of which contacts can be obtained having a small and very slight depth of penetration. For explanation of this latter it is noted that when melting the contact material in general a little of the semi-conductor material will dissilve therein, which semi-conductor material, when cooling, again crystallizes out and grows to the semi-conductor body. Dependent on the composition of the contact material, for example a rectifying or an ohmic junction will form between the crystallised material and the body. The larger the quantity of contact material which covers a unit of surface of the body, the more of the covered semi-conductive material will dissolve and the larger consequently is the depth of penetration.

The condition that the hitting speed of the contact material is so large in this case may be used for obtaining definite configurations of the resulting contacts.

In FIGURE 6 an alloying jig is shown which is equal to that of FIGURE 4 but in which a tungsten wire 50, 10$\mu$ thick, is stretched across the semi-conductor body 33. When the contact material 35 hits this wire, it will extend laterally and form two contacts 51 (see FIGURE 7).

It is noted that it is recommendable in those cases in which the contact material is to move along a surface of the jig during rapid rotation as was the case in the jigs shown in FIGURES 2 and 3 and FIGURE 5 respectively, to finish the said surface very smoothly so as to prevent sticking of the material to the surface. Such a surface may be covered, if desired, with a layer of soot or very finely divided silicon oxide. Also the slope of the surface may be bent or buckled so that the resistance which is experienced by the contact material decreases as soon as this material starts moving, see for example the dashed line slope 60 in FIGURE 5.

In addition it is pointed out, that, when the jig has more than one place for receiving contact material, which spaces each contain quantities of contact material, which can be thrown on various spots of the semi-conductor body, it may be achieved, by choosing different angles of gradient of the channels which connect these spaces with that of the body, that first one quantity and then another is thrown.

In an analogous manner, when the jig has more than one space for the contact material, which spaces are connected to the space for the semi-conductor body by apertures, the width of these apertures, the place where they are, and/or the melting point of the contact material may be varied so that first one quantity is thrown on the body and then another.

The instant at which the contact material was thrown on the semi-conductor body was determined in the above methods either by reaching a critical rotation speed or by reaching the melting temperature of the electrode material, so without interference from without.

However, it is also possible to effect the instant of throwing the contact material at any moment from without. A device suitable for this purpose for example consists of a centrifuge drum 70, see FIGURE 8, in which a number of holders 71 for alloying jigs is provided. These holders are rotatable about shafts 72 which extend parallel to the axis of rotation and to the generatrices of the drum. Each holder has a forked operating arm 73, the split part of which projects outside the drum and encloses a stud 74 which is provided on a ring 75. This ring encloses the whole drum 70 and, within certain limits, is rotatable about the drum so that, when shifting the ring, the holders 71 for the alloying jigs are tilted. When for example the drum rotates in the direction indicated by the arrow 76 and the ring is retarded by the brake shoe 77, the holders 71 will be tilted to the left. One of the alloying jigs 78 placed in the holders 71 is shown in two positions in the FIGURES 9 and 10. In the position shown in FIGURE 9 which precedes the tilting, the contact material 79 is pressed in its space 80 by the centrifugal force operative in the direction of the arrow 81. As a result of the tilting, the jig is displaced so that the channel 82 which extends from the space 80 to the semi-conductor body 83 extends in a radial direction. The contact material is now forced out of the space 80 and thrown on the body (FIGURE 10).

It is noted that the arrangement of the jigs as shown in FIGURE 8 renders it possible to provide more jigs against the inner wall of the centrifuge drum than for example in the device shown in FIGURES 2 and 3. This arrangement as shown in FIGURE 8, in which consequently the axes of rotation of the jigs extend in axial direction may be constructed to produce a device which operates according to the principle of the device shown in FIGURES 2 and 3 when the operating device consisting of the members 73, 74, 75 and 77 is replaced by springs which permit the tilting only at a definite rotation speed.

What is claimed is:

1. In the manufacture of a semiconductor device, a method of alloying an electrode contact to a substantially monocrystalline semiconductive body portion, comprising providing within a centrifuge rotatable about an axis a substantially monocrystalline semiconductive body located remote from the said axis and providing spaced therefrom at least during rotation at least one mass of meltable contact material located closer to the axis of rotation than the semiconductive body, said mass when molten being a solvent for the semiconductive body and including at least one active substance selected from the group consisting of acceptors and donors, heating the said one mass of contact material until it melts, rotating the centrifuge at a high speed, when the said one mass is molten and the centrifuge has achieved a speed at which the centrifugal force acting on the mass substantially exceeds the force of gravity that would have acted on the mass had the mass been simply dropped on the semiconductive body from a height equal to its spacing from the latter, casting the entire said one molten mass onto the semiconductive body portion to cover uniformly, dissolve and alloy with a surface portion thereof, and thereafter cooling the melt to solidify the contact material alloyed to the body forming underneath a regrown semiconductive portion whose conductivity is modified by the absorption therein of the said active substance.

2. A method as set forth in claim 1 wherein the centrifuge contains a tiltable jig with spaced locations for receiving the semiconductive body and the meltable mass and in a first position holding the meltable mass in a stable position, and the centrifuge is rotated at a speed at which centrifugal force tilts the jig into a second position and the molten mass becomes unstable and is thrown onto the semiconductive body.

3. A method as set forth in claim 1 wherein the centrifuge contains a tiltable jig with spaced locations for receiving the semiconductive body and the meltable mass and in a first position holding the latter in a stable position, and, after the centrifuge has reached the selected speed, the jig is tilted into a second position and the molten mass becomes unstable and is thrown onto the semiconductive body.

4. A method as set forth in claim 2 wherein the jig contains plural spaces, for receiving plural masses, each connected to the body location by channels of different slope so that as the jig tilts due to rotation between the first and second positions the masses successively climb their associated channel under the action of the centrifugal force and are successively cast onto the semiconductive body.

5. In the manufacture of a semiconductor device, a method of alloying an electrode contact to a substantially monocrystalline semiconductive body portion, comprising providing within a centrifuge rotatable about an axis a jig containing a first space for receiving a substantially monocrystalline semiconductive body and a second space for receiving at least one mass of meltable material, said mass when molten being a solvent for the semiconductive body and including at least one active substance selected from the group consisting of acceptors and donors, said first and second spaces communicating via a narrow channel through which the mass can pass only when molten and when subjected to a given force, said second space being nearer the axis of rotation than the first space, placing within the first and second spaces, respectively, a substantially monocrystalline semiconductive body and the meltable mass, heating the said mass of contact material until it melts, rotating the centrifuge at a high speed sufficient to produce a centrifugal force acting on the mass which substantially exceeds the force of gravity that would have acted on the mass had the mass been simply dropped on the semiconductive body from a height equal to its spacing from the body and which centrifugal force is sufficient to urge the entire said molten mass through the narrow channel and onto the semiconductive body portion to cover uniformly, dissolve and alloy with a surface portion thereof, and thereafter cooling the melt to solidify the contact material alloyed to the body forming underneath a regrown semiconductive portion whose conductivity is modified by the absorption therein of the said active substance.

6. A method as set forth in claim 5 wherein the centrifuge is first rotated, and after a selected speed has been achieved, the mass is melted allowing it to traverse the narrow channel.

7. A method as set forth in claim 5 wherein plural spaces are provided to receive plural masses of different melting points, and the jig is first heated to the melting point of one mass and later to the melting point of another mass, so that these masses upon becoming molten are successively cast onto the semiconductivt body while it is rotated in the centrifuge.

8. A method as set forth in claim 5 wherein plural spaces are provided for receiving plural masses, and plural channels are provided of different widths each connected to one of the plural spaces, said centrifuge being rotated at successively higher speeds until the masses are successively cast onto the semiconductive body, the higher speeds being required to increase the centrifugal force required to urge the mass through the narrowing channels.

9. In the manufacture of a semiconductor device, a method of alloying an electrode contact to a substantially monocrystalline semiconductive body portion, comprising providing within a centrifuge rotatable about an axis a jig containing a first space for receiving a substantially monocrystalline semiconductive body and a second space for receiving at least one mass of meltable contact material, said mass when molten being a solvent for the semiconductive body and including at least one active substance selected from the group consisting of acceptors and donors, said second space being below the first space and also nearer the axis of rotation, and communicating with the first space via an upwardly inclined channel, providing within the first and second spaces, respectively, a semiconductive body and at least one mass of said meltable contact material, heating the said one mass of contact material until it melts, rotating the centrifuge at a high speed at which, when the said one mass is molten, the centrifugal force overcomes the gravitational force moving the molten mass up the inclined channel and casting the entire said one molten mass onto the desired semiconductive body portion to cover uniformly, dissolve and alloy with a surface portion thereof, and cooling the melt to solidify the contact material alloyed to the body forming underneath a regrown semiconductive portion whose conductivity is modified by the absorption therein of the said active substance.

10. A method as set forth in claim 1 wherein a masking element is provided over a central region of the semiconductive surface, and the molten mass is cast onto the semiconductive surface past the masking element, which divides the melt into plural separated portions forming plural electrode contacts to the semiconductive body.

References Cited by the Examiner

UNITED STATES PATENTS

| | | | |
|---|---|---|---|
| 1,944,435 | 1/34 | Kerr et al. | 22—65.1 |
| 2,037,618 | 4/36 | Carpenter | 22—65.1 |
| 2,086,483 | 7/37 | Touceda et al. | 22—65.1 |
| 2,192,043 | 2/40 | Hooper | 22—65.1 |
| 2,194,182 | 3/40 | Kotterman | 117—200 |
| 2,606,347 | 8/52 | Hildreth | 22—65.1 |
| 2,705,768 | 4/55 | Kleimack | 148—1.5 X |
| 2,888,782 | 6/59 | Epstein | 148—1.5 |
| 2,906,930 | 9/59 | Raithel | 148—1.5 |
| 2,913,642 | 11/59 | Jenny | 148—1.5 |
| 3,097,112 | 7/63 | Schutze | 117—201 |

FOREIGN PATENTS

| | | |
|---|---|---|
| 1,063,232 | 4/54 | France. |

DAVID L. RECK, *Primary Examiner.*

OSCAR R. VERTIZ, HYLAND BIZOT, *Examiners.*